United States Patent Office 2,830,322
Patented Apr. 15, 1958

2,830,322

APPARATUS FOR THE FORMING OF LAMINATED PLASTIC MATERIALS

Stowell W. Mears, Greensburg, Pa.

Application January 18, 1955, Serial No. 482,638

5 Claims. (Cl. 18—19)

This invention relates to improvements in apparatus for shaping laminated plastic materials from relatively flat sheets.

Heretofore, there have been certain industrial applications of sheets of laminated plastics including a ply of cloth fabric or other nonplastic material interposed between plys of synthetic plastic material such as a polyester or vinyl plastic. In view of the fact that the decorative ply is easily distorted by a flow of the plastic material to thereby destroy the decorative effect, the use of this material has been limited to flat or gently curving structures. It is a principal object of this invention to form such laminated material into shapes including relatively sharp bends while preventing distortion of the decorative ply.

Another object of this invention is to form fabric-plastic laminate into a configuration including relatively sharp bends and finding particular utility as a lighting fixture shade.

Another object of this invention is to simplify the forming of fabric-plastic laminates.

Another object of this invention is to provide apparatus for forming shapes from fabric-plastic laminate at a relatively high production rate.

Another object of this invention is to provide a press for shaping fabric-plastic laminates which is of simple construction and which is simple to operate.

The above objects of this invention may be accomplished by providing a press including means which will initially clamp spaced portions of the fabric-plastic laminate and thereafter subject the sheet to bending which is confined to the unclamped portions.

Other objects and advantages will appear from the following specification taken in connection with the accompanying drawings wherein.

Figure 1:
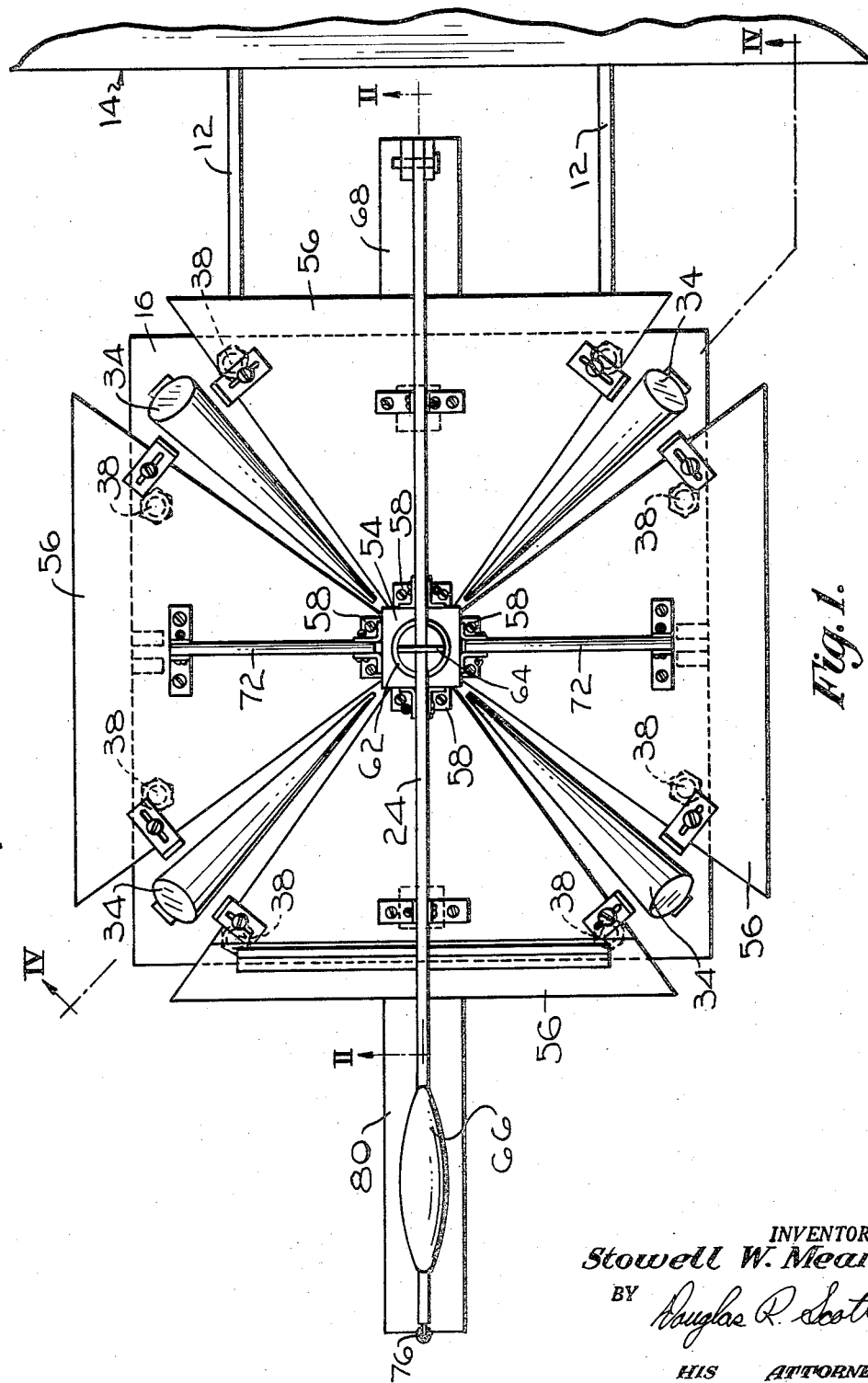
Fig. 1 is a plan view of a press embodying this invention.

Referring more particularly to Figs. 1 through 4, the press embodying this invention is shown as comprising a carriage 10 movable on a pair of tracks 12 into and out of an oven 14. The carriage 10 includes a base plate 16 having secured to the underside thereof two pairs of wheels 18 which are adapted to ride on the tracks 12. Yieldably mounted upon the base plate 16 is a lower die plate 20. Superposed above the lower die plate 20 is an upper die plate 22 which is adapted to be reciprocated relative to the base plate 16 by actuating means including a manually operable lever 24.

The lower die plate 20 includes a centrally located square block 26 from which extends a centrally located pintle 28. A plurality, in this instance four, of plates 30 of trapezoidal configuration are disposed about the periphery of the block 26 and are flexibly secured thereto at their inner ends by hinges 32. The trapezoidal plates 30 are angularly spaced from each other and interposed between each pair of adjacent plates is a conical forming element 34. Each conical forming element 34 is supported on the base plate 16 by a bracket 36 and is disposed with its apex extending toward the central block 26.

The outer portion of each plate 30 is supported by abutment means in the form of a pair of studs 38, each of which is threaded into the base plate 16 and locked relative thereto by a lock nut 40. Depending from the lower side of each trapezoidal plate 30 is an arm 42 which extends slidably between a pair of uprights 44 supported on the base plate 16. The arms 42 thus coact with the uprights 44 to restrain the plates 30 from lateral movement.

Figure 2:
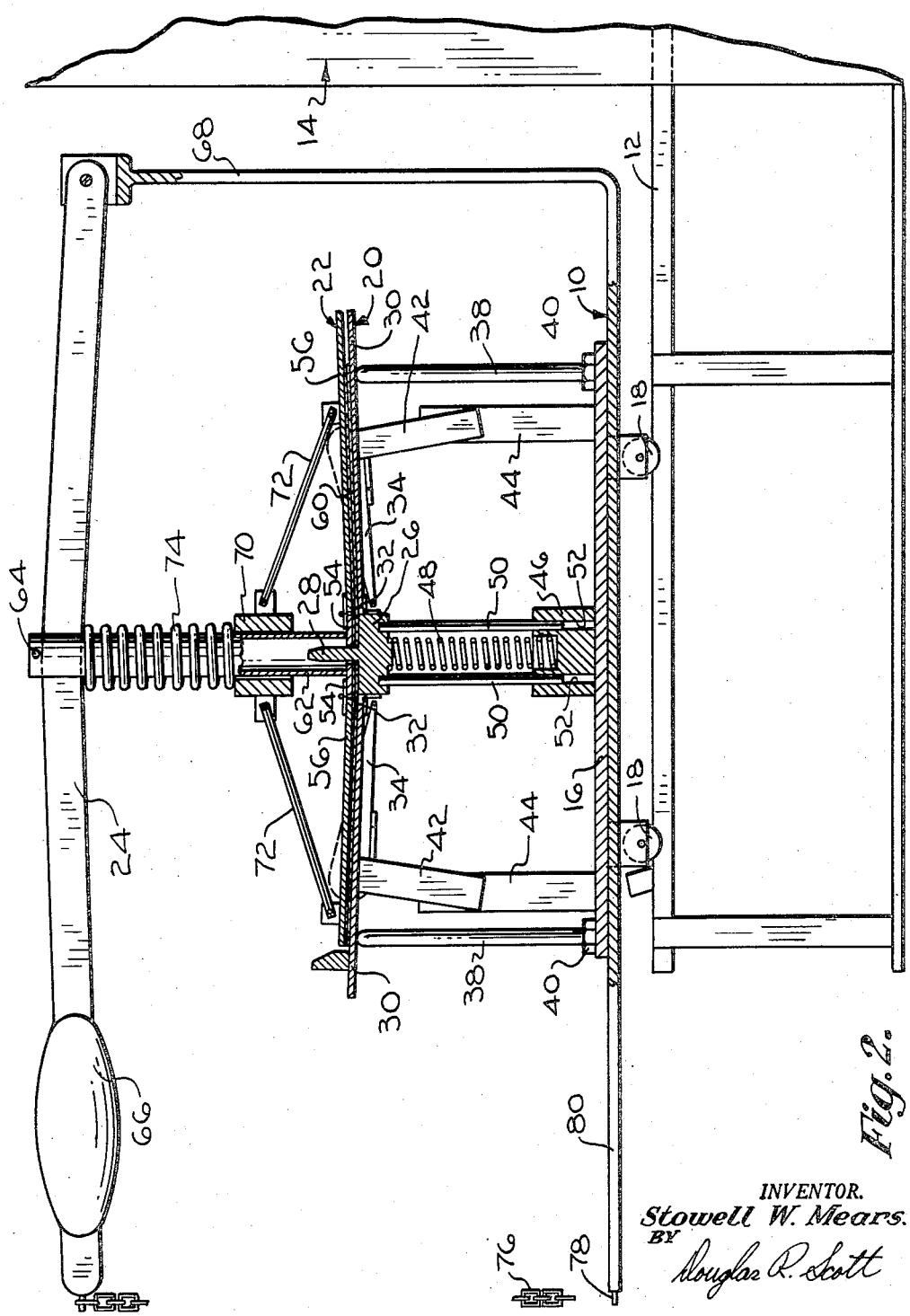
Fig. 2 is a sectional view taken on the line II—II of Fig. 1.
Figure 3:
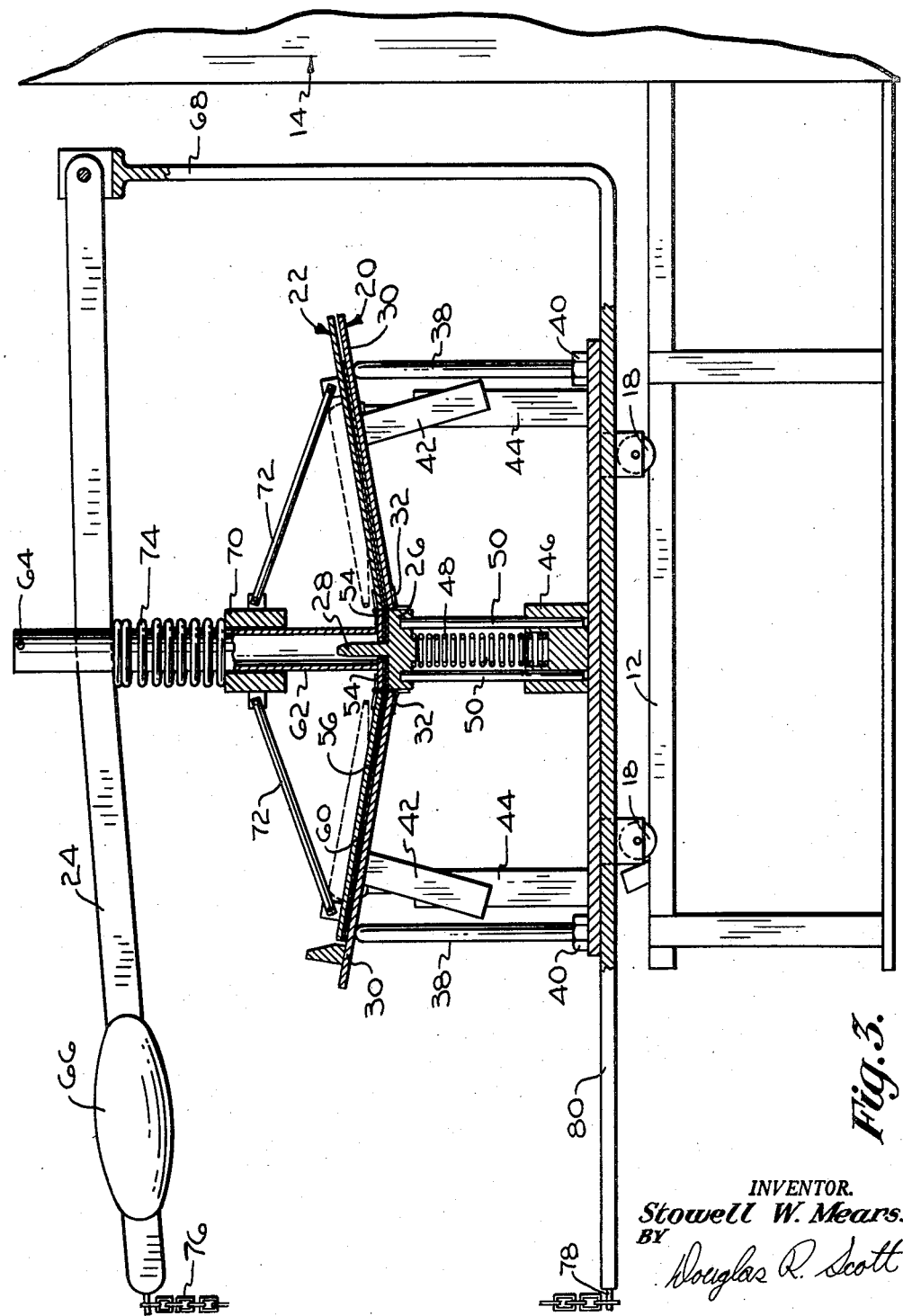
Fig. 3 is a view similar to Fig. 2 with various parts of the apparatus in different operating positions.
Figure 4:
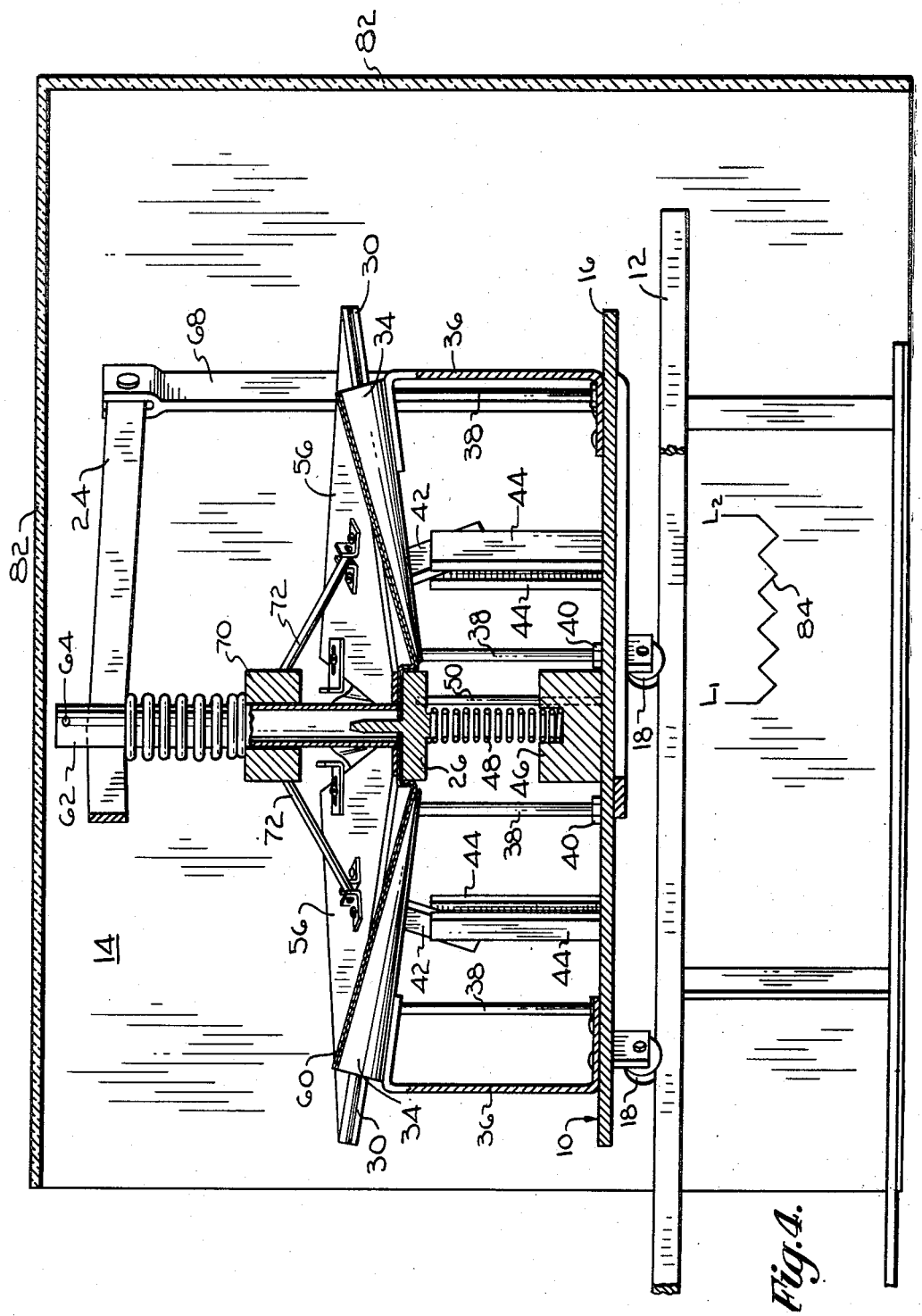
Fig. 4 is a sectional view taken on the line IV—IV of Fig. 1 showing the various parts of the apparatus in operating positions corresponding to the positions of Fig. 3.

Secured to the base plate 16 is a centrally located block 46 which forms a seat for a spring 48. The spring 48 extends into engagement with the block 26 of the lower die plate 20 to bias the block 26 away from the base plate 16. The spring 48 is of sufficient strength to normally maintain the upper surface of the block 26 substantially level with the upper ends of the studs 38 thus normally maintaining the lower die plate 20 in a substantially planar form as shown in Fig. 2. A plurality of guide rods 50 depend from the block 26 and extend slidably into suitable bores 52 formed in the block 46 to restrict the block 46 to vertical reciprocable movement.

The upper die plate 22 is similar to the lower die plate 20 and includes a central square plate 54 which registers with the block 26 of the lower die plate 20. The plate 54 is apertured at its center to receive the pintle 28 for aligning the die plate assemblies 20, 22. Four angularly spaced plates 56 of trapezoidal configuration are disposed about the periphery of the central plate 54 and are flexibly secured thereto at their smaller ends by hinges 58. The plates 56 register respectively with the plates 30 of the lower die assembly 20 and the entire upper die assembly 22 is adapted to move into and out of engagement with the lower die plate 20.

Means is provided for reciprocating the upper die plate 22 relative to the lower die plate 20 so that the upper and lower die plates may be separated to permit insertion of a sheet 60 of fabric-plastic laminate between the upper and lower die plates. This means is here shown as comprising a tubular element 62 secured at one end to the central plate 54 of the upper die plate 22 and extending vertically therefrom. The upper end of the tubular element 62 is slotted to receive the lever 24 and a pin 64 traverses the slotted end of the element 62 to prevent withdrawal of the lever 24 therefrom. The lever 24 is provided at one end with a handle 66 and is pivoted at its other end on a bracket 68 which extends from the base plate 16. It will thus be apparent that to separate the upper and lower die plates 20, 22, the lever 24 is rotated in a clockwise direction to engage the pin 64 and lift the assembly of the tubular element 62 and parts connected thereto off the lower die plate 20.

When the upper and lower die plates 20, 22 are separated, the laminate sheet 60 may be placed on the lower die plate 20, the sheet 60 preferably being provided with a centrally located aperture to receive the pintle 28 for locating purposes. The lever 24 may then be rotated in a counterclockwise direction as viewed in Figs. 2 and 3 to move the upper die plate 22 into engagement with the laminate sheet 60.

It has been found that it is desirable to exert clamping pressure on the trapezoidal plates 56 of the upper die plate 22 after the latter has moved into engagement with the laminate sheet 60. To this end, an apertured block 70 is slidably mounted on the tubular element 62 and is connected to each of the trapezoidal plates by a link 72. Each link 72 is pivoted at one end on the block 70 and is pivotally connected at its other end to one of the plates 56. A spring 74 encompasses the tubular element and extends between the block 70 and the lever 24 to normally bias the same away from each other. In operation, counterclockwise movement of the lever 24 will first move the upper die plate assembly 22 into engagement with the laminate 60 on the lower die plate 20. Further counterclockwise movement of the lever 24 will compress the spring 74 to apply a thrust to the collar 70. This thrust is transmitted through the links 72 to the plates 56 to apply a clamping pressure thereto adjacent their outer edges. Further counterclockwise movement of the lever 24 will cause the lever 24 to bottom in the slot formed in the end of the tubular element 62 and pressure will then be transmitted directly to the central plate 54 of the upper die plate 22 to move the same downward against the bias of the spring 48.

Means is provided for clamping the lever 24 in its lowermost position. This means is here shown as comprising a chain 76 secured at one end to the free end of the lever 24 and engageable with a suitable pin 78 carried by a bracket 80 extending from the base plate 16.

The oven 14 comprises a plurality of walls 82 defining an enclosed space in which is disposed suitable heating means here shown diagrammatically as an electrical heating element 84 connected between line wires L1 and L2. When the heating element 84 is energized, it will create within the oven 14, a zone which is maintained at an elevated temperature. This temperature is sufficiently high to assure incipient fusion of the plastic material in the laminate being formed. The tracks 12 extend into the oven 14 and the oven 14 is of sufficient size to contain the entire carriage 10 and parts carried thereon.

In operation, a sheet of laminate comprising at least two plys of plastic material with a decorative ply interposed therebetween is placed upon the lower die plate 20 when the carriage 10 is positioned outside of the oven 14. The upper die plate 22 is then lowered into engagement with the laminate sheet 60. The entire carriage 10 is then rolled along the rails 12 until it is positioned within the oven 14 where the entire sheet of laminate is subjected to an elevated temperature.

When the carriage 10 is positioned within the oven 14, downward pressure is exerted on the handle 66 of the lever 24 by an operator to maintain a clamping pressure on the links 72 and a downward thrust on the central plate 54 of the upper die plate 22. As the laminate sheet 60 begins to soften, the downward pressure exerted on the handle 66 will cause the sheet 60 to yield at those portions between the trapezoidal plates 30, 56 and permit downward movement of the central plate 54 and block 26 of the die plates. As the central portions of the die plates move downward, the outer portions of the trapezoidal plates will be retained in elevated positions because of the engagement thereof with the studs 38. The bending of the laminate is thus confined to the unsupported spaces between adjacent pairs of the plates 56, 30 and distortion of the decorative ply of the laminate within the clamping portions is precluded.

It is to be noted that in the operation hereinbefore described, bending of the laminate sheet begins the instant the same is sufficiently heated to permit forming since the pressure is applied thereto prior to heating. It has been found that the same is effective to eliminate distortion of the decorative ply during forming.

In the apparatus thus far described, it is to be noted that downward movement of the upper and lower die plates will cause the laminate sheet to be bent over the conical forming elements 34 thereby assuring more uniform bends in the unclamped portions of the sheet. However, it is to be understood that the tapered forming elements 34 may be eliminated if a sharper bend between the clamped portions of the sheet is desired.

After downward movement of the lever 24 is completed and the laminate sheet is in its final form, the chain 76 may be hooked on the pin 78 to retain pressure on the laminate sheet and the carriage 10 may be withdrawn from the oven 14 so that the finished article will cool. After cooling, the chain 76 is released and the lever 24 manipulated to separate the upper and lower die plates 20, 22. The finished article may then be lifted from the lower die plate.

It is to be noted that with the apparatus herein illustrated and described, the formed laminate sheet is particularly adaptable for use as a lamp shade, being of a generally dished configuration with four flat, trapezoidal surfaces extending from a square central surface separated from each other by tapered pleats, the decorative ply in that portion of the sheet comprising said pleats being substantially free of distortion and thus providing an extremely attractive shade.

Figure 5:
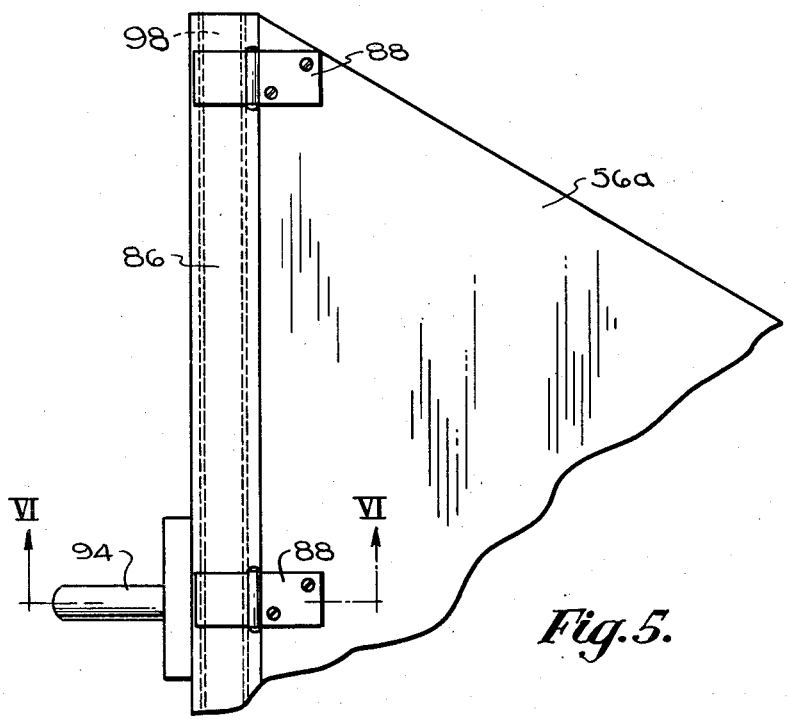
Fig. 5 is a fragmentary plan view of a modification of this invention.
Figure 6:
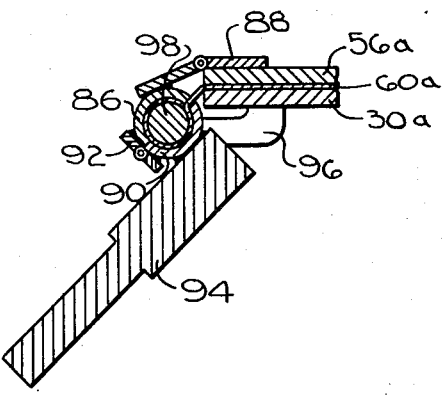
Fig. 6 is a sectional view taken on the line VI—VI of Fig. 5.
Figure 7:
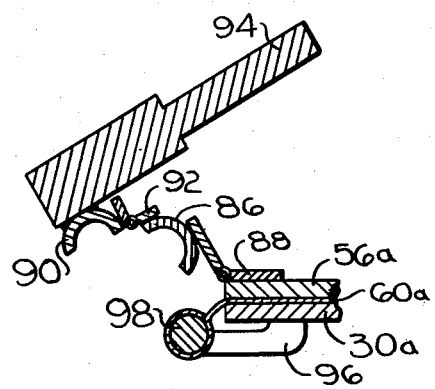
Fig. 7 is a view similar to Fig. 6 and showing the various parts of the apparatus in different operating positions.

Referring now to Figs. 5, 6 and 7, the embodiment shown therein is identical to that shown in the preceding figures differing only in that there has been added thereto mechanism for applying a cylindrical roll to the end portions of the laminate sheet where they extend from between the trapezoidal clamping plates of the upper and lower die assemblies. Accordingly, parts corresponding to parts hereinbefore described are designated by similar reference numerals having the suffix "a."

More particularly, the apparatus for forming a roll along each edge of the plastic laminate lamp shade hereinbefore described comprises a first semicylindrical element 86 connected by hinges 88 to the edge of each plate 56a of the upper die assembly. A second semicylindrical element 90 is connected to the first semicylindrical element 86 by a plurality of hinges 92, only one of which is shown. An actuating handle 94 is also secured to the semicylindrical element 90 and extends normal to the axis thereof.

Depending from the lower surface of each plate 30a is a pair of spaced brackets 96 adapted to support a cylindrical rod 98 with the axis thereof parallel to the outer edge of the plate 30a. The rod 98 serves as a forming piece about which the outer portion of the sheet 60a may be wrapped and is preferably axially slidable in the brackets 96 so that it may be removed from the rolled portion of the sheet after the forming operation.

In operation, the sheet 60a is clamped between the plates 56a, 30a and, after heating, the handle 94 is moved generally downward, as viewed in Fig. 7 to move the semicylindrical element 86 into engagement with the sheet 60a and force a portion of the sheet 60a to follow the curvature of the rod 98. The handle 94 is then pivoted on the hinges 92 to swing the semicylindrical element 90 into engagement with the sheet 60a, forcing the latter to follow the contour of the rod 98. The various parts of the apparatus are then in the positions shown in Fig. 6 and it will be noted that the weight of the handle 94 serves to maintain the semicylindrical elements 86, 90 snugly in engagement with the sheet 60a. When the forming operation is completed, the semicylindrical elements 86, 90 may be returned to the positions shown in Fig. 7 and the rod 98 moved axially out of the brackets 96 to free the sheet 60a. It will thus be apparent that the apparatus herebefore described is capable of producing radial and marginal bending in a laminate sheet.

Although preferred embodiments of the invention have been described and illustrated, it is to be understood that the same are illustrative only and are not to be taken by way of limitation, the scope of this invention being defined in the appended claims.

I claim:

1. A forming device comprising: a lower die, said lower die including a central element, a plurality of planar elements disposed about the periphery of said central element and angularly spaced from each other, and means defining an articular connection between each of said planar elements and said central element; abutment means for supporting the outer ends of said planar elements; yieldable means for supporting said central element to normally maintain the same and said planar elements in substantially the same plane to define a support for a substantially flat sheet of deformable material; an upper die, said upper die including a central element, a plurality of planar elements disposed about the periphery of said last named central element and angularly spaced from each other, and means defining an articular connection between each of said last named planar elements and said last named central element; and means for moving said upper die toward said lower die to clamp the deformable material therebetween and thereafter depress said central elements to bend the material at points between said planar elements.

2. A forming device comprising: a lower die, said lower die including a centrally located planar element of polygonal configuration, a plurality of planar elements of trapezoidal configuration disposed about the periphery of said central element and angularly spaced from each other, and means defining an articular connection between said polygonal and said trapezoidal elements; abutment means for supporting the outer ends of said trapezoidal elements; yieldable means for supporting said polygonal element to normally maintain the same and said trapezoidal elements in substantially the same plane to define a support for a substantially flat sheet of deformable material; an upper die, said upper die including a centrally located element of polygonal configuration, a plurality of planar elements of trapezoidal configuration disposed about the periphery of said last named polygonal element and angularly spaced from each other, and means defining an articular connection between said last named polygonal and said last named trapezoidal elements; and means for moving said upper die toward said lower die to clamp the deformable material therebetween and thereafter depress said polygonal elements to bend the material at points between said trapezoidal elements.

3. A forming device as claimed in claim 2 and including a plurality of conical forming elements interposed respectively between said trapezoidal elements of said lower die and supported independently thereof.

4. A forming device as claimed in claim 2 and including an elongated forming element pivotally mounted along the outer edge of each of said trapezoidal elements, a cylindrical forming element adjacent the outer edge of each of said lower trapezoidal elements, the first said forming element being complementary with said cylindrical forming element, and means for moving said first elements into coaxial relation with said cylindrical elements respectively.

5. A forming device comprising: a lower die, said lower die including a central element, a plurality of planar elements disposed about the periphery of said central element and angularly spaced from each other, and means defining an articular connection between each of said planar elements and said central element; abutment means for supporting the outer ends of said planar elements; yieldable means for supporting said central element to normally maintain the same and said planar elements in substantially the same plane to define a support for a substantially flat sheet of deformable material, an upper die, said upper die including a central element, a plurality of planar elements disposed about the periphery of said last named central element and angularly spaced from each other, and means defining an articular connection between each of said last named planar elements and said last named central element; means for reciprocating said last named central element; and a plurality of links operatively connected at one end to said last named central element and at the other end to said upper planar elements respectively.

References Cited in the file of this patent

UNITED STATES PATENTS

| | | |
|---|---|---|
| 2,420,119 | Boehm et al. | May 6, 1947 |
| 2,433,643 | Beach et al. | Dec. 30, 1947 |
| 2,454,437 | Ehnborn | Nov. 23, 1948 |
| 2,471,739 | Gregg | May 31, 1949 |
| 2,670,501 | Michiels | Mar. 2, 1954 |
| 2,677,918 | Bird et al. | May 1, 1954 |

FOREIGN PATENTS

| | | |
|---|---|---|
| 1,088,987 | France | Sept. 22, 1954 |
| 723,476 | Great Britain | Feb. 9, 1955 |